United States Patent Office 3,438,465
Patented Apr. 15, 1969

3,438,465
SPOT-TYPE SERVO DISC BRAKE
Henry James Butler, Sutton Coldfield, England, assignor to Dunlop Rubber Company Limited, London, England, a British company
Filed May 27, 1963, Ser. No. 283,237
Claims priority, application Great Britain, May 30, 1962, 20,768/62
Int. Cl. F16d 55/00
U.S. Cl. 188—73
9 Claims

ABSTRACT OF THE DISCLOSURE

The invention relates to a servo disc brake incorporating an axially movable non-rotatable caliper straddling a portion of the periphery of a disc and having friction elements for engagement with opposite faces of the disc. The caliper has guide means in the form of a guide and stress receiving surface for slidably guiding one friction element in a direction which is inclined towards the opposed surface of the disc in the direction of rotation of the disc and which serves positively to limit the movement of the friction element to a movement along a straight line defined by the guide means.

---

This invention relates to disc brakes and more particularly relates to disc brakes of the self-energising or servo kind.

British patent specification No. 767,099 describes and illustrates a servo disc brake comprising a rotatable, axially-fixed disc, a non-rotatable, axially-fixed housing straddling the disc and covering a minor portion of the braking surfaces thereof, friction pads associated with the housing on both sides of the disc, the axes thereof being inclined to the perpendicular from the plane of the disc and a mechanism for forcing the pads into frictional engagement with the disc. Said mechanism preferably comprises fluid pressure operated piston and cylinder mechanisms on both sides of the disc and the axes of said mechanisms may be aligned with the axes of the inclined friction pads.

The present invention relates to improvements or modifications in servo disc brakes of this kind.

According to the present invention a servo disc brake comprises a friction pad assembly on one side of the disc the axis thereof being inclined to the perpendicular from the plane of the disc and a friction pad assembly on the other side of the disc, the axis thereof being perpendicular to the plane of the disc, a non-rotatable housing to guide and support the friction pad assemblies and a mechanism for effecting frictional engagement between the friction pad assemblies and the disc.

Preferably said mechanism comprises a piston and cylinder incorporated in the housing and associated with the inclined pad, the axis thereof being aligned with the axis of the pad.

With such a construction it is necessary either for the disc to be axially movable or for the housing to be capable of axial or substantially axial movement.

One embodiment of the present invention will now be described with reference to the accompanying drawings of which:

Figure 1:
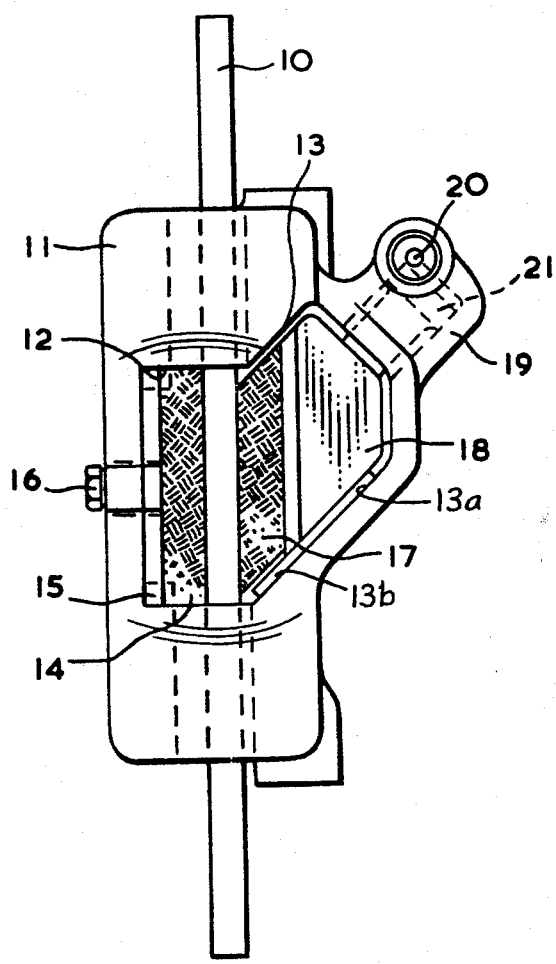
FIGURE 1 is a plan view of a disc brake according to the present invention.
Figure 2:
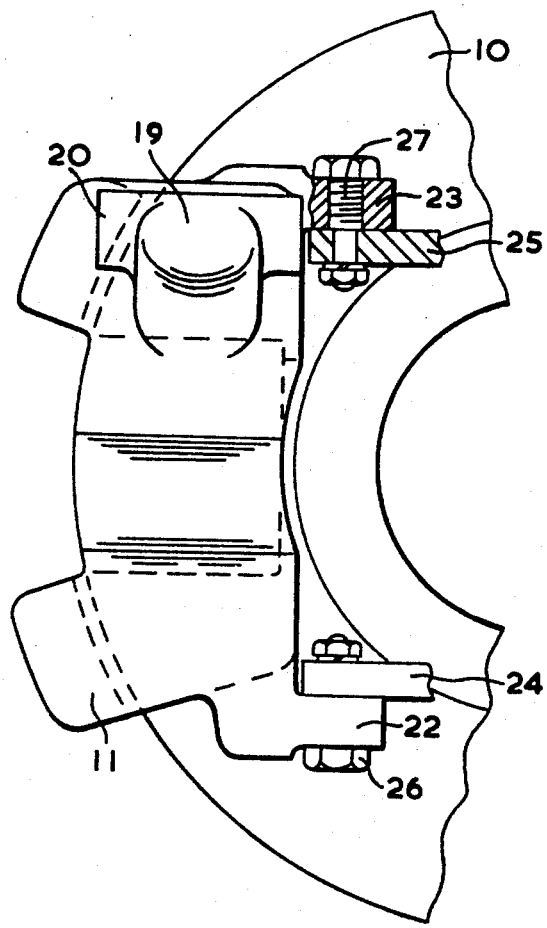
FIGURE 2 is a side elevation of the disc brake illustrated in FIGURE 1.

The disc brake illustrated in FIGURES 1 and 2 comprises an annular brake disc 10 secured to a rotatable wheel hub (not illustrated) and a caliper-type housing 11 straddling the outer periphery of the disc 10. The housing 11 which covers only a minor portion of the opposite braking surfaces of the disc 10, is conveniently of one-piece construction and is provided intermediate its ends with a pair of radially-extending apertures 12, 13 positioned one adjacent each braking surface of the disc 10.

The aperture 12 one one side of the disc is rectangular in section and is presented squarely to the adjacent braking surface of the disc. The aperture 13 on the other side of the disc has a surface 13d for supporting and receiving the thrust of a friction element and which is presented obliquely to the adjacent braking surface of the disc, for example, at an angle of the order of 45° to the perpendicular from the plane of the disc and inclined towards the normal direction of rotation of the disc 10 at that location. This oblique aperture has a guide and stress receiving surface 13a to support a friction element slidable to move parallel to the surface 13a toward and from the disc 10. A layer or plate 13b of low friction material is mounted on the surface 13a to lessen the friction on this surface.

A friction pad assembly comprising a pad of friction material 14 attached to a backing plate 15 is located in the aperture 12 and rigidly secured to the housing 11 by a bolt 16 passing through a hole in the housing 11 and screwed into a screw-threaded hole in the backing plate 15.

A second friction pad assembly comprising a pad of friction material 17 having an inclined plane face to abut the adjacent braking surface of the disc is also provided with a backing plate 18. The friction pad assembly is slidable in the aperture 13 towards and away from the adjacent braking surface of the disc 10.

The housing 11 on the inclined pad 17 side of the disc 10 is provided with a cylinder 19 which is provided with an inlet port 20 which is adapted to be connected to a source of fluid pressure such as a master cylinder. The axis of the cylinder 19 is axially aligned with that of the inclined friction pad 17. A piston 21 fluid-tightly slidable in the cylinder 19 abuts the backing plate 18 of the inclined friction pad assembly to force it towards the disc 10.

In order that both friction pads 14, 17 may be forced into frictional engagement wtih the disc 10 either the disc itself or the housing 11 must be permitted to move axially. In the brake illustrated in FIGURE 2 the housing 11 is provided with a pair of lugs 22, 23 pivotally attached to links 24, 25, by means of pivot pins 26, 27. The links 24, 25 are similarly secured to a non-rotatable part of the vehicle (not shown).

The housing 11 is thus free to move without tilting, in an axial direction of the disc 10. It order to centralise the housing 11 with respect to the disc 10, resilient bushes, or similar means may be incorporated in the link pivots, but this is not essential.

In an alternative construction the disc is fixed axially and a pair of non-rotatable friction pad guide plates are located close to the adjacent braking surfaces of the disc. The guide plates may be joined together adjacent the outer periphery of the disc to form a caliper and are provided with apertures in which two friction pads, one squarely presented and one obliquely presented, are slidable. A separate brake-applying mechanism to force the pads into frictional engagement with the disc may comprise a U-shaped member straddling the outer periphery of the disc and incorporating in the limb associated wtih the inclined friction pad a piston and cylinder mechanism.

Having now described my invention, what I claim is:

1. A disc brake comprising a disc rotatable on its axis, a non-rotating element comprising a caliper straddling a portion of the periphery of said disc and a stationary member adjacent to said disc on which said caliper is mounted for movement in an axial direction relative to said disc, first and second friction elements for engagement with opposite faces of said disc located in said caliper, said non-rotating element having spaced, rigid, parallel, torque-taking, abutment surfaces inclined to a line normal to the radial surfaces of said disc to form a guide means engaged by said first friction element to guide said first friction element towards and from a radial surface of said disc and positively to limit the movement of said friction element in its movement towards and from said disc to a movement along a straight line defined by said guide means so that said first friction element is guided towards said disc in a plane normal to a radius of said disc and is prevented by said guide means from moving in said plane in the direction of rotation of said disc circumferentially beyond the straight line established by said guide means, a fluid pressure cylinder in said caliper, the axis of said cylinder being parallel to said guide means, and a piston movable in said cylinder and engaging said first friction element for applying said first friction element to said disc, said second friction element being applied to the opposite side of the disc by the reaction on the caliper when fluid is supplied to said cylinder.

2. A disc brake comprising a rotatable disc, a non-rotating, axially movable element having a pair of limbs, one limb on each side of said disc and each limb having an aperture extending inwardly toward the axis of said disc to receive a friction element at least one of said apertures having a surface for supporting and guiding a brake element which is presented obliquely to the adjacent braking surface of the disc and inclined toward the normal direction of rotation of the disc, a friction element in each said aperture, the friction element in that aperture having the oblique surface having a surface complementary to said oblique surface, the oblique surface forming guide means which serves positively to limit the movement of said friction element in its movement towards and from said disc to a movement along a straight line defined by said guide means so that said first friction element is guided towards said disc in a plane normal to a radius of said disc and is prevented by said guide means from moving in said plane in the direction of rotation of said disc circumferentially beyond the straight line established by said guide means and means acting on said friction element in the direction of the slope of said oblique surface to move said friction element into frictional contact with the adjacent surface of said disc.

3. A servo disc brake comprising a rotatable disc, a non-rotatable, axially movable housing movable axially of said disc and having spaced parts one adjacent to an area of the braking surface on one side of said disc and the other adjacent to a similarly positioned area on the other side of said disc, a friction element fixed on one of said parts and facing said disc, the opposite part of said hausing having a guide and stress receiving surface inclined toward the opposed surface of said disc in the direction of rotation of said disc and a friction element slidable on said guide and stress receiving surface in a direction parallel with said guide and stress receiving surface to contact a surface of said disc on an area coaxial with said fixed friction element, said guide and stress receiving surface forming guide means which serves positively to limit the movement of said friction element in its movement towards and from said disc to a movement along a straight line defined by said guide means so that said first friction element is guided towards said disc in a plane normal to a radius of said disc and is prevented by said guide means for moving in said plane in the direction of rotation of said disc circumferentially beyond the straight line established by said guide means, and means acting in a direction parallel with said guide and stress receiving surface to move said slidable friction element toward and from said disc.

4. A servo disc brake according to claim 3 wherein the slidable friction element comprises a backing element slidable on said surface and a pad of friction material secured to said backing plate, the braking face of said friction pad being so angled with respect to its own direction of movement as to engage the associated braking face of the disc in face-to-face contact.

5. A servo disc brake according to claim 3 wherein the fixed friction element comprises a backing plate detachably secured to said housing and a pad of friction material secured to said backing plate.

6. A servo disc brake according to claim 3 wherein the mechanism for moving said friction element comprises a cylinder incorporated in the housing having a piston fluid-tightly slidable therein, said piston being associated with the slidable friction element, the axis of said cylinder being aligned with the axis of the friction pad assembly.

7. A servo disc brake according to claim 6 wherein the housing comprises a caliper straddling the outer periphery of the disc and covering a minor portion only of the braking surfaces thereof.

8. A servo disc brake according to claim 6 wherein the housing is formed with an aperture for each friction pad assembly through which the friction pad can be removed.

9. A servo disc brake according to claim 8 wherein a layer of low friction material is interposed between the slidable friction element and said inclined surface.

References Cited

UNITED STATES PATENTS

| 2,689,024 | 9/1954 | Trevaskis | 188—152 |
| 3,042,152 | 7/1962 | Butler | 188—73 |

FOREIGN PATENTS

| 1,019,873 | 11/1957 | Germany. |
| 788,841 | 1/1958 | Great Britain. |
| 1,277,054 | 10/1961 | France. |

GEORGE E. A. HALVOSA, *Primary Examiner*